United States Patent
Larsson et al.

(10) Patent No.: US 9,756,542 B2
(45) Date of Patent: Sep. 5, 2017

(54) CO-CHANNEL DEPLOYMENT OF NEW AND LEGACY CARRIER TYPES

(71) Applicant: Telefonaktiebolaget L M Ericsson (publ), Stockholm (SE)

(72) Inventors: Daniel Larsson, Vallentuna (SE); Jung-Fu Cheng, Fremont, CA (US); Sorour Falahati, Stockholm (SE); Mats Folke, Luleå (SE); Mattias Frenne, Uppsala (SE); Havish Koorapaty, Saratoga, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 88 days.

(21) Appl. No.: 14/783,914

(22) PCT Filed: Apr. 16, 2014

(86) PCT No.: PCT/SE2014/050472
§ 371 (c)(1),
(2) Date: Oct. 12, 2015

(87) PCT Pub. No.: WO2014/171887
PCT Pub. Date: Oct. 23, 2014

(65) Prior Publication Data
US 2016/0057684 A1 Feb. 25, 2016

Related U.S. Application Data

(60) Provisional application No. 61/812,478, filed on Apr. 16, 2013.

(51) Int. Cl.
*H04W 72/04* (2009.01)
*H04W 36/26* (2009.01)
(Continued)

(52) U.S. Cl.
CPC ........... *H04W 36/26* (2013.01); *H04W 24/02* (2013.01); *H04W 56/001* (2013.01);
(Continued)

(58) Field of Classification Search
CPC ... H04W 36/26; H04W 36/165; H04W 24/02; H04W 56/001; H04W 88/02;
(Continued)

(56) References Cited

U.S. PATENT DOCUMENTS

2009/0325626 A1* 12/2009 Palanki ................. H04L 5/0007
455/522
2011/0081856 A1* 4/2011 Johansson .......... H04B 7/15542
455/7
(Continued)

FOREIGN PATENT DOCUMENTS

WO 2010128910 A1 11/2010
WO 2012109790 A1 8/2012
(Continued)

OTHER PUBLICATIONS

Unknown, Author , "Component carrier operation without PDCCH", 3GPP TSG-RAN WG1 Meeting #58 R1-093598 (R1-093466) Shenzhen, China Source: Panasonic, Aug. 24-28, 2009, 1-4.
(Continued)

*Primary Examiner* — Afsar M Qureshi
(74) *Attorney, Agent, or Firm* — Murphy, Bilak & Homiller, PLLC

(57) ABSTRACT

Methods for changing a carrier type from a first carrier type to a second carrier type are disclosed. An example method may be implemented in one or more nodes of a cellular system that includes a plurality of cells that can each be selectively operated with either a first carrier type or a second carrier type, one of the first and second carrier types
(Continued)

either having substantially fewer reference symbols than the other or lacking a control structure supported by the other, or both. The example method begins with determining (800) that a cell or cells should be switched from the first carrier type to a second carrier type. This may be done based on, for example, an evaluation of UE performance criteria, e.g., whether one or more UEs are capable of operating on the second carrier type and/or whether one or more UEs may receive a higher quality of service from the second carrier type. The example method continues with changing (810) the carrier type on the cell or cells from the first carrier type to the second carrier type.

44 Claims, 11 Drawing Sheets

(51) Int. Cl.
*H04W 24/02* (2009.01)
*H04W 56/00* (2009.01)
*H04W 68/02* (2009.01)
*H04W 36/16* (2009.01)

(52) U.S. Cl.
CPC ....... *H04W 68/02* (2013.01); *H04W 72/0453* (2013.01); *H04W 36/165* (2013.01)

(58) Field of Classification Search
CPC .......... H04W 72/0453; H04W 72/0406; H04L 61/6022; H04L 5/0048; H04J 2011/0096
USPC ................................................ 370/329, 331
See application file for complete search history.

(56) References Cited

U.S. PATENT DOCUMENTS

| | | | |
|---|---|---|---|
| 2011/0103243 A1 | 5/2011 | Larsson et al. | |
| 2011/0249633 A1 | 10/2011 | Hong et al. | |
| 2012/0122455 A1 | 5/2012 | Frenger et al. | |
| 2013/0003672 A1 | 1/2013 | Dinan et al. | |
| 2013/0003673 A1 | 1/2013 | Dinan et al. | |
| 2013/0308481 A1* | 11/2013 | Kazmi | H04W 24/02 370/252 |
| 2015/0208411 A1* | 7/2015 | Mochizuki | H04W 72/1226 455/452.1 |
| 2015/0288562 A1* | 10/2015 | Nammi | H04W 24/02 370/254 |
| 2016/0183261 A1* | 6/2016 | Koorapaty | H04W 28/085 370/239 |
| 2016/0192361 A1* | 6/2016 | Dinan | H04W 56/0005 370/329 |

FOREIGN PATENT DOCUMENTS

| | | |
|---|---|---|
| WO | 2013074026 A1 | 5/2013 |
| WO | 2013080446 A1 | 6/2013 |
| WO | 2014091825 A1 | 6/2014 |

OTHER PUBLICATIONS

Unknown, Author, "E-PDCCH starting symbol configuration", 3GPP TSG RAN WG1 Meeting #70bis R1-124103 San Diego, USA Source: CATT, Oct. 8-12, 2012, 1.
Unknown, Author, "DL Control channel enhancements with carrier aggregation solutions", TSG-RAN WG1#66 R1-112137 Source NEC Group Athens, Greece, Aug. 22-26, 2011, 1-6.
Unknown, Author, "Views on additional carrier types for CA in Rel-11", 3GPP TSG RAN1 #66bis R1-113104 Source Pantech Zhuhai, China, Oct. 10-14, 2011, 1-5.

* cited by examiner

CO-CHANNEL DEPLOYMENT OF NEW AND LEGACY CARRIER TYPES

TECHNICAL FIELD

The present disclosure relates generally to wireless communication systems, and more particularly to multi-carrier operation in such systems.

BACKGROUND

The $3^{rd}$-Generation Partnership Project (3GPP) continues to develop specifications for the fourth-generation wireless communication system known as "Long Term Evolution" or "LTE." LTE uses Orthogonal Frequency-Division Multiplexing (OFDM) in the downlink (transmissions from base station to mobile terminal) and Discrete Fourier Transform (DFT)-spread OFDM in the uplink (transmissions from mobile terminal to base station). The basic LTE downlink physical resource can thus be seen as a time-frequency grid, where each resource element corresponds to one OFDM subcarrier during one OFDM symbol interval.

In the time domain, LTE downlink transmissions are organized into radio frames of 10 milliseconds, each radio frame consisting of ten equally-sized subframes of length Tsubframe=1 millisecond. Resource allocation in LTE is typically described in terms of resource blocks, where a resource block corresponds to one slot (0.5 milliseconds) in the time domain and 12 contiguous subcarriers in the frequency domain. A pair of two adjacent resource blocks in time direction (1.0 millisecond) is known as a resource block pair. Resource blocks are numbered in the frequency domain, starting with the number 0 at one end of the system bandwidth.

Downlink transmissions in LTE are dynamically scheduled, which means that in each subframe the base station transmits control information identifying those terminals to which data is transmitted and identifying the resource blocks in which the data is transmitted, for the current downlink subframe. This control signaling is typically transmitted in the first 1, 2, 3 or 4 OFDM symbols in each subframe, via a channel known as the Physical Downlink Control Channel (PDCCH). The particular number of symbols dedicated to the control channel region in each subframe (n=1, 2, 3 or 4) is specified by a Control Format Indicator (CFI). The downlink subframe also contains common reference symbols, which are known to the receiver and used for coherent demodulation of e.g. the control information. A downlink system with CFI=3 OFDM symbols used for the control region is illustrated in FIG. 1.

As of Release 11 of the 3GPP specifications for LTE, the above-described resource assignments can also be scheduled on an enhanced Physical Downlink Control Channel (EPDCCH). Unlike the PDCCH, the EPDCCH is mapped to resource elements in the data region of the downlink subframe, i.e., to those resource elements that are not in the control region and that are not used for reference symbols, synchronization signals, and the like. For systems and equipment that are compliant only to earlier releases (Releases 8 to 10) of the 3GPP specifications for LTE, only the PDCCH is available for scheduling of resource assignments.

SUMMARY

Proposals have been made for the development of new signal formats and carrier configurations to address increasing demands for higher data rates and system throughputs, ubiquitous coverage, energy efficiency, environmental friendliness, etc. An inherent problem with many of these proposals is that existing equipment, especially mobile terminals (known as "user equipment" or "UEs" in 3GPP terminology), may be unable to access or properly operate with these new signal formats and carrier configurations. Another problem is that wireless networks may benefit from dynamic deployment of these new signal formats and carrier configurations, i.e., where the new signal formats and/or carrier configurations are turned on or off, sometimes at very high rates, depending upon system needs. Accordingly, techniques are needed to facilitate the dynamic deployment of these technologies while maintaining a reasonable degree of compatibility with "legacy" mobile terminals, i.e., those mobile terminals that are generally adapted to operate in the wireless network but that are not capable of accessing or properly operating with the new signal formats and/or carrier configurations.

Accordingly, an object of several embodiments of the techniques and apparatus disclosed herein is to provide methods for changing a carrier type from a first carrier type to a second carrier type. An example method may be implemented in one or more nodes of a cellular system that includes a plurality of cells that can each be selectively operated with either a first carrier type or a second carrier type, one of the first and second carrier types either having substantially fewer reference symbols than the other or lacking a control structure supported by the other, or both.

The example method begins with determining that a cell or cells should be switched from the first carrier type to a second carrier type. This may be done based on, for example, an evaluation of UE performance criteria, e.g., whether one or more UEs are capable of operating on the second carrier type and/or whether one or more UEs may receive a higher quality of service from the second carrier type. The example method continues with changing the carrier type on the cell or cells from the first carrier type to the second carrier type.

In some embodiments, as discussed in detail below, the first carrier type is an LTE legacy carrier type and the second carrier type is a carrier type having substantially fewer reference symbols than the LTE legacy carrier type. In some of these embodiments, the second carrier type comprises a discovery signal, such as a discovery signal that includes a first synchronization signal having a signal structure common to a second synchronization signal carried by the first carrier type, but where the first synchronization signal appears in the second carrier type less frequently than the second synchronization signal appears in the first carrier type.

In some embodiments, the method further includes triggering a relocation of all mobile terminals served by the cell or cells to one or more additional cells, prior to changing the carrier type. In other embodiments, the method includes triggering a relocation of mobile terminals that are served by the cell or cells and that do not support the second carrier type to one or more additional cells, prior to changing the carrier type. In any of these embodiments, triggering the relocation of mobile terminals served by the cell or cells may comprise triggering a relocation of one or more of the mobile terminals to a different carrier frequency. Alternatively, triggering the relocation of mobile terminals served by the cell or cells may comprise informing the mobile terminals of a change in carrier type, or may comprise handing over all or some of the mobile terminals to a new cell and/or to a new frequency. Triggering the relocation of mobile terminals served by the cell or cells may alternatively comprise initiating a Radio Resource Control connection release for the mobile terminals.

In some embodiments, the method further comprises informing at least those mobile terminals that are served by the cell or cells and that support the second carrier type of an upcoming change in carrier type, prior to changing the carrier type on the cell or cells from the first carrier type to the second carrier type. This informing may include, for example, sending one or more parameters for the second carrier type. These parameters may include, in some embodiments, one or more of a time, frame, or subframe, for the change in carrier type, a cell identifier for the second carrier type, and reference signal configuration information for the second carrier type. This informing may comprise, in some embodiments, the use of one or more of the following to inform those mobile terminals that are served by the cell or cells and that support the second carrier type of an upcoming change in carrier type: a broadcasted master information block or system information block; a physical downlink control channel message or enhanced physical downlink control channel message that is scrambled using an identifier that indicates an upcoming change in carrier type; a transmitted control format indicator having a value that indicates an upcoming change in carrier type; a transmitted flag, normally used for indicating a start symbol for a downlink channel, having a value that indicates an upcoming change in carrier type; and a flag in a paging message addressed to one or more mobile terminals.

Corresponding methods suitable for implementation in a mobile terminal are also disclosed. An example of one such method is for managing a transition from one carrier type to another, one of the carrier types either having substantially fewer reference symbols than the other or lacking a control structure supported by the other, or both. This example method begins with receiving an indication that a currently received carrier is changing from a first carrier type to a second carrier type. The method further includes maintaining ongoing transmission processes and hybrid-ARQ buffers through the change in carrier types, or maintaining Radio Resource Control (RRC) configuration and a cell-specific mobile terminal identifier through the change in carrier types, or both. The cell-specific mobile terminal identifier may be a Cell Radio Network Temporary Identifier (C-RNTI), for example.

Network node apparatus and mobile terminal apparatus adapted to carry out several of the techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
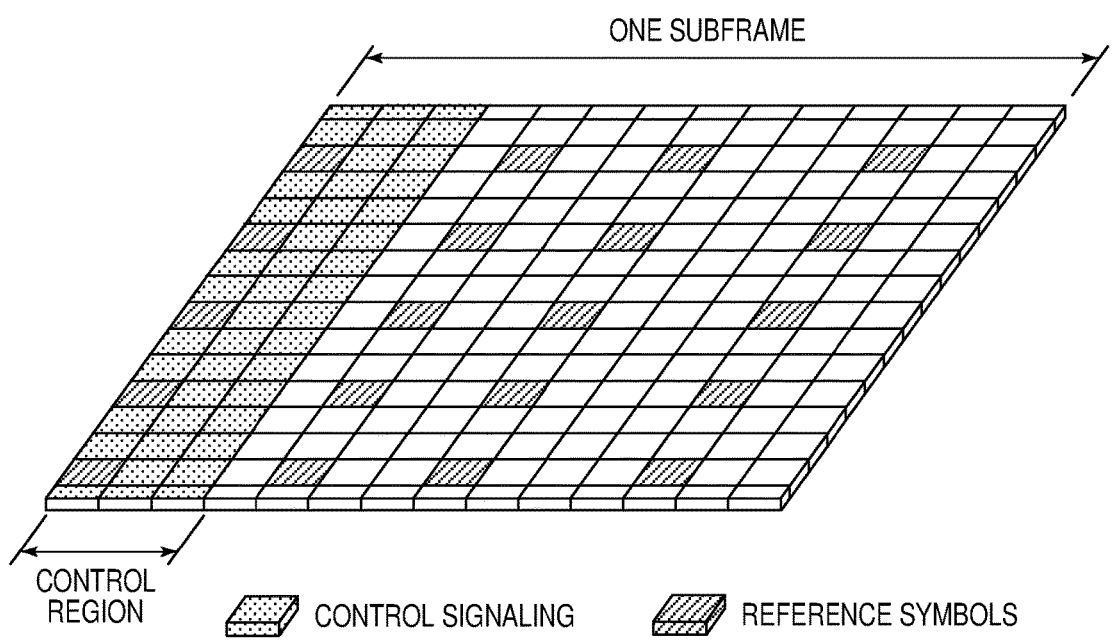
FIG. 1 illustrates Long-Term Evolution (LTE) physical resources.

Within the context of this disclosure, the terms "mobile terminal," "wireless terminal," or "wireless device" refer to any terminal that is able to communicate wirelessly with an access node of a wireless network by transmitting and/or receiving wireless signals. Thus, the term "mobile terminal" encompasses, but is not limited to: a user equipment (e.g., an LTE UE), whether that user equipment is a cellular telephone, smartphone, wireless-equipped tablet computer, etc.; a stationary or mobile wireless device for so-called machine-to-machine (M2M) communication or machine-type communication (MTC); or an integrated or embedded wireless card forming part of a computer or other electronic equipment; a wireless card, dongle, or the like, for plugging in to a computer or other electronic equipment. Throughout this disclosure, the terms "user equipment" and "UE" are sometimes used to exemplify various embodiments. However, this should not be construed as limiting, as the concepts illustrated herein are equally applicable to other wireless terminals. Hence, whenever a "user equipment" or "UE" is referred to in this disclosure, this should be understood as encompassing any mobile terminal or wireless terminal as defined above.

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes.

Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

References throughout the specification to "one embodiment" or "an embodiment" mean that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

While the following examples are described in the context of LTE systems, the principles described in the following disclosure may be equally applied to other functional contexts and other cellular networks, including cellular networks based on 3GPP standards for W-CDMA networks.

Figure 2:
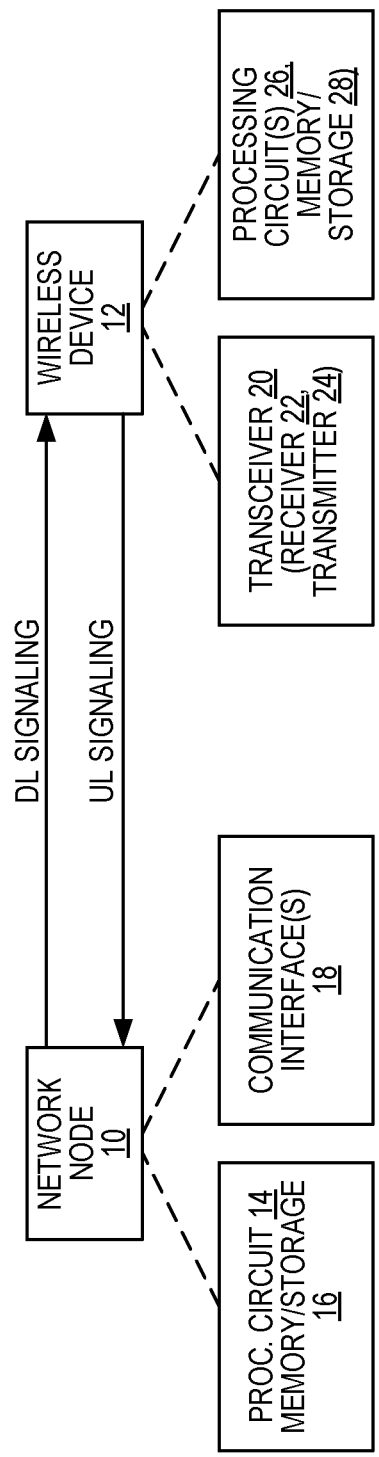
FIG. 2 shows an example network node and an associated mobile terminal.

FIG. 2 illustrates an example network node 10 and an associated mobile terminal 12, to which, in which, and with which the presently disclosed techniques may be applied. In an example configuration, the network node 10 comprises an eNodeB or other network-side transmitter configured for operation in an LTE-based wireless communication network, and the mobile terminal 12 is configured for complementary operation. While the mobile terminal 12 may be referred to as a User Equipment or UE according to Third Generation Partnership Project (3GPP) terminology, it should be broadly understood as essentially any wireless apparatus, wireless device, etc., configured according to the teachings herein.

Further, it should be understood that FIG. 2 illustrates functional and/or physical circuit arrangements and that the network node 10 and the mobile terminal 12 generally will include digital processing circuits and associated memory or other computer-readable medium, for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions. The functional circuits realized in this manner may be referred to as "processing circuits," "processors," "units," or the like.

In the illustrated example, the network node 10 includes a processing circuit 14 and associated memory/storage 16.

The memory/storage 16 may be one or more types of computer-readable medium, such as a mix of volatile, working memory and non-volatile configuration and program memory or storage. The network node 10 further includes one or more communication interfaces 18.

The communication interface(s) 18 depend on the nature of the network node 10. In a base station or other radio node example, the communication interface(s) 18 include a radio transceiver (e.g., pools of radio transmission, reception, and processing circuitry) for communicating with any number of mobile terminals 12 in any one or more cells of a wireless communication network. Note that the network node 10 may support Carrier Aggregation (CA) operation, Time Division Duplex (TDD) operation, Multiple-Input-Multiple-Output (MIMO) operation, etc.

Further, the communication interface(s) 18 may include inter-base-station interfaces and/or backhaul or other core network (CN) communication interfaces. In an LTE-based example where the network node 10 comprises an eNodeB, the communication interface(s) 18 include an "X2" interface for inter-eNodeB communications.

The mobile terminal 12 may be a cellular radiotelephone (smartphone, feature phone, etc.), or may be a network adaptor, card, modem or other such interface device, or may be a laptop computer or other such device with integrated wireless communication capabilities. Of course, these examples are non-limiting and the mobile terminal 12 should be broadly understood as a communications transceiver configured according to the teachings herein.

FIG. 2 illustrates the mobile terminal 12 as including a transceiver 20, which includes a receiver 22 and a transmitter 24, e.g., cellular radio circuits. The illustrated mobile terminal 12 further includes one or more processing circuits 26, which include or are associated with one or more memory/storage devices or circuits 28. The memory/storage devices or circuits 28 include, for example, one or more types of computer-readable medium. Example media include a mix of volatile, working memory and non-volatile configuration and program memory or other storage—e.g., EEPROM and/or FLASH memory.

Those of ordinary skill in the art will appreciate that the transmitter 20 and/or receiver 22 each may comprise a mix of analog and digital circuits. For example, the receiver 22 in one or more embodiments comprises a receiver front-end circuit (not explicitly shown in FIG. 2) which generates one or more streams of digital signal samples corresponding to antenna-received signal or signals, along with one or more receiver processing circuits—e.g., baseband digital processing circuitry and associated buffer memory—which operate on the digital samples. Example operations include linearization or other channel compensation, possibly with interference suppression, and symbol demodulation and decoding, for recovering transmitted information. Likewise, the transmitter 24 in one or more embodiments comprises transmitter processing circuits—e.g., baseband digital processing circuitry and associated buffer memory—which perform encoding of data to be transmitted, as well as one or more power amplifiers and other radio circuitry controlled by the transmitter processing circuits to modulate one or more radio carriers with the encoded data for transmission.

As 3GPP continues to develop improvements and additions to the specifications for LTE, to address increasing demands for higher data rates and system throughputs, ubiquitous coverage, energy efficiency, environmental friendliness, etc., proposals have been made for the development of new signal formats, carrier configurations, etc. An inherent problem with many of these proposals is that existing equipment, especially mobile terminals (known as "user equipment" or "UEs" in 3GPP terminology), may be unable to access or properly operate with these new signal formats and carrier configurations. Another general problem is that wireless networks may benefit from dynamic deployment of these new signal formats and carrier configurations, i.e., where the new signal formats and/or carrier configurations are turned on or off, sometimes at very high rates, depending upon system needs. Accordingly, techniques are needed to facilitate the dynamic deployment of these technologies while maintaining a reasonable degree of compatibility with "legacy" mobile terminals, i.e., those mobile terminals that are generally adapted to operate in the wireless network but that are not capable of accessing or properly operating with the new signal formats and/or carrier configurations.

The discussion that follows refers to "carrier types," and may refer to a "legacy carrier type" and a "new carrier type." For the purposes of the present disclosure, the former, i.e., the "legacy carrier type," should be understood as referring to a backward-compatible carrier with respect to a particular release or generation of mobile terminals. In the LTE context, for example, a legacy carrier type may be characterized by the fact that Release 8, Release 9, and Release 10 UEs can operate on it. For simplicity it may be interchangeably referred to in the following discussion as "carrier type A" or a "legacy carrier type" (LCT). UEs supporting such a carrier (but not supporting a particular new carrier type) may be referred to herein as Type A UEs.

The second carrier type, i.e., the "new carrier type," should be understand in the context of the present disclosure to be a carrier type that legacy UEs do not support and that either have substantially fewer reference symbols than the legacy carrier type or lack a control structure supported by the legacy carrier type, or both. In the LTE context, for example, a new carrier type may be a carrier that either carries no cell-specific reference symbols (CRS) at all or that carries many fewer CRS than the legacy carrier type. A new carrier type that carries many fewer CRS than the legacy carrier type may be formed, for example, by reducing the bandwidth over which the CRS are distributed, so that the covered bandwidth is smaller than the carrier bandwidth. Alternatively, a new carrier type may be formed by reducing the number of CRS with respect to time, with respect to a legacy carrier, such as by not transmitting any CRS in certain pre-defined subframes. Both techniques may be used.

Another example of a new carrier type in the LTE context is a carrier that does not carry any PDCCH, but instead carries only the enhanced PDCCH, which does not rely on CRS for demodulation. This carrier type, which is referred to herein as "carrier type B" or "new carrier type" (NCT), is attractive for its energy efficiency properties, its low control and reference signal overhead and low level of interference generation in networks when compared to carrier type A. A UE that supports carrier type B, as well as carrier type A, may be referred to as a Type B UE.

It will be appreciated that while much of the present discussion is directed to the use of a carrier according to the "carrier type B" described above, the concepts, techniques, and apparatus described herein may be more generally adapted to the handling of first and second carrier types where one of the carrier types has substantially fewer reference symbols than the other or lacks a control structure supported by the other, or both, such that a legacy population of mobile terminals cannot properly support it. Another example of such a carrier type may at least at times include a "discovery signal" or synchronization signal that is transmitted by a small cell (e.g., a so-called picocell or microcell), e.g., for the purposes of synchronization and/or radio resource management (RRM), but that is not recognizable to legacy UEs.

In the context of LTE, for any of the new carrier types described above, the lack of CRS and/or PDCCH will make the new carrier type not accessible by legacy release UEs when deployed. In other words, the new carrier type is not backwards-compatible. For the purposes of illustration, this type of carrier is referred to as carrier type B.

Figure 3:
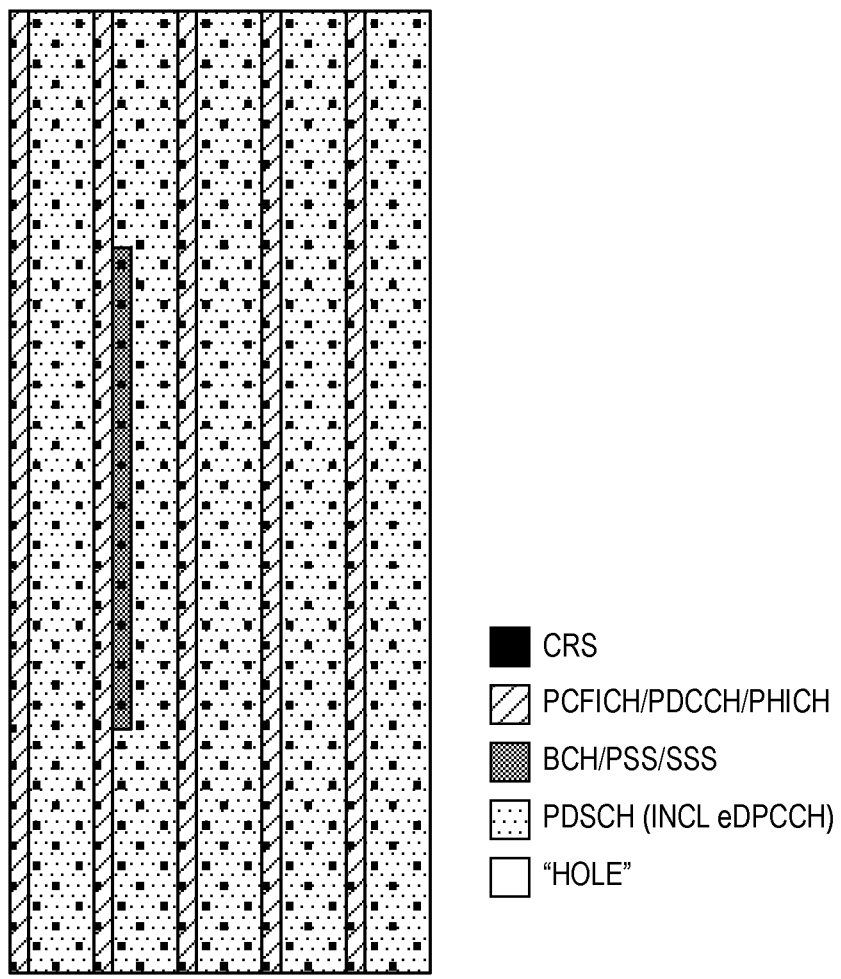
FIG. 3 illustrates an example of carrier type A.
Figure 4:
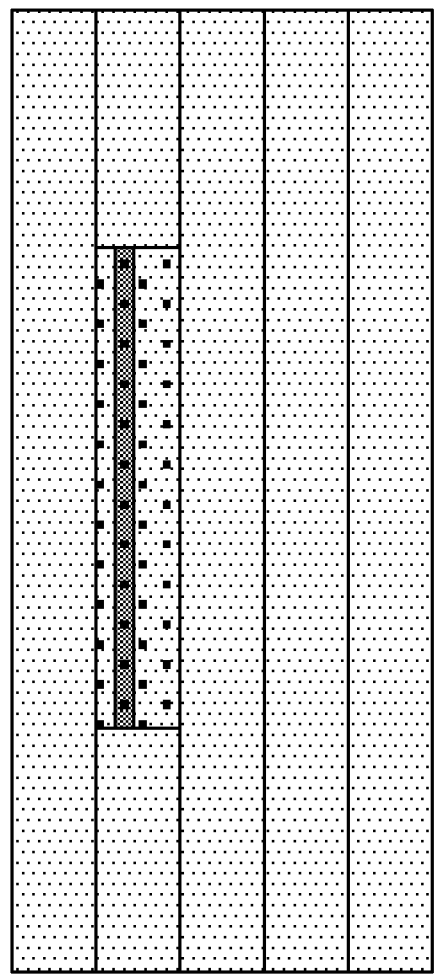
FIG. 4 shows an example of carrier type B.

Examples of carrier type A and carrier type B are illustrated in FIG. 3 and FIG. 4, respectively. In those figures, the entire bandwidth of the carrier is represented in the vertical dimension, while several subframes are represented in the horizontal dimension. As can be seen in FIG. 3, the legacy carrier type has CRS scattered throughout the carrier bandwidth and across all of the illustrated subframes. A broadcast channel (BCH) and synchronization signals (including the Primary Synchronization Signal, PSS, and Secondary Synchronization Signal, SSS) are transmitted only in one of the illustrated subframes and only across a limited portion of the carrier bandwidth.

FIG. 4, which uses the same markings to indicate the locations of CRS, BCH, SSS, and PSS, illustrates an example of a new carrier type, where the CRS are confined to only a single one of the illustrated subframes and are also confined to a limited portion of the carrier bandwidth. In this particular example, the CRS are confined to the same subframe and same bandwidth over which the BCH/PSS/SSS are transmitted, but this need not be the case—in other examples CRS might be transmitted in other time-frequency resources, instead of or in addition to those shown.

Because the new carrier type is not backwards-compatible with Type A UEs, a problem arises when the operator of a wireless network that includes at least two carriers of carrier type A would like to switch at least a first carrier to utilize the new carrier type, instead of the legacy carrier type, e.g., due to its merits in enhanced downlink performance, and lower energy consumption, and due to the presence of terminals that support carrier type B in the networks. However if an operator makes a hard switch of said first carrier to carrier type B, legacy UEs that are operating there will immediately have to move to a second carrier of carrier type A operated by the operator. Under some circumstances, such as during an early deployment of a new carrier type, the second carrier may not be able to handle a large increase in legacy UEs, which may severely degrade the performance for legacy UEs. Described in the following are several embodiments of techniques and apparatus for supporting such a switch in the network, without severely limiting the UEs that only support carrier type A.

These techniques may be used to operate a new carrier type and a legacy carrier type on the same frequency. This is done by being able to change a cell from one carrier type to another, based on criteria that are dependent on UE and/or network performance. Further, several of the procedures and designs disclosed below may utilize certain compatibilities between the legacy carrier type and new carrier type, as well as the capabilities of type B UEs (supporting both the legacy and new carrier types). This approach may be used to maintain a high user experience and to reduce signaling overheads both in air interface and in core network during the carrier type changes.

For the purposes of the detailed examples presented below, it may be assumed that the operator operates two different frequencies on which the basic operation is that carrier type A is deployed. These two frequencies are here referred to as F1 and F2. It is further assumed that the network is also capable of employing carrier type B on one or both of these frequencies. It should be understood that the solutions described herein are not limited to an operator deployment with only two different frequencies and that a larger number of frequencies may also be used.

Figure 5:
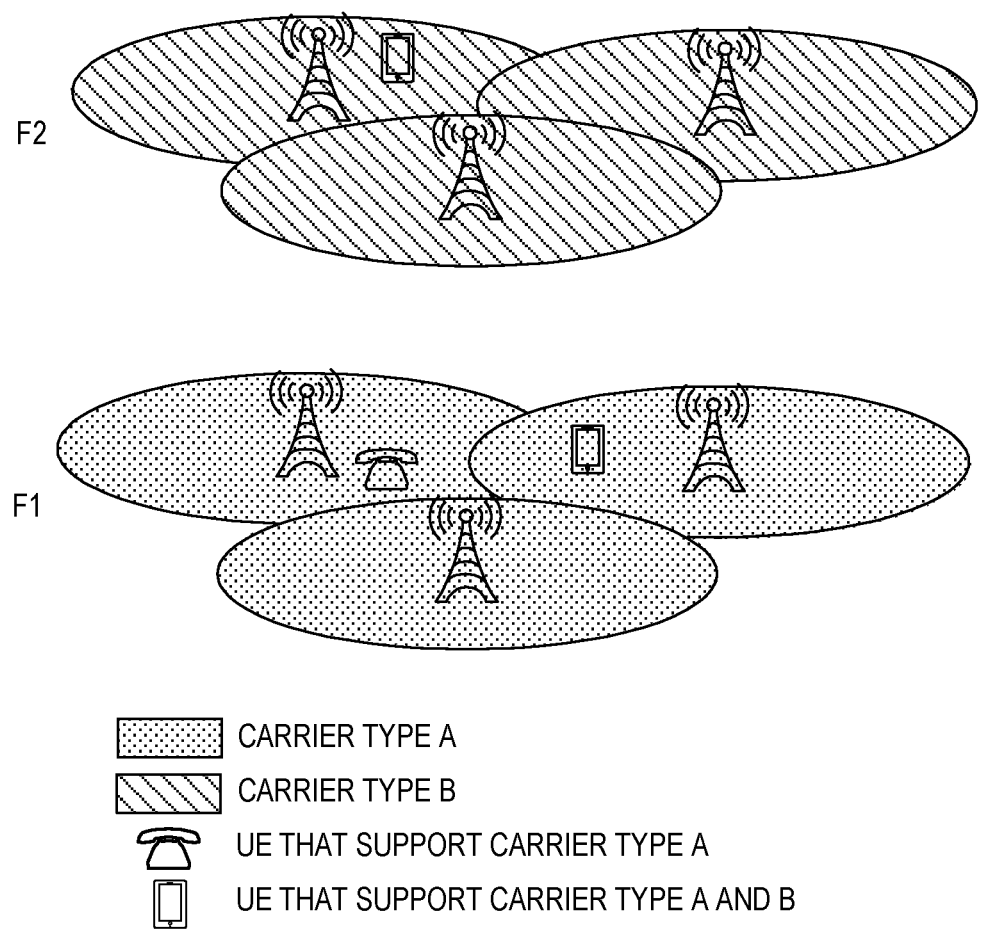
FIG. 5 illustrates an example deployment of cells using multiple carrier types.

In a first scenario in which the presently disclosed techniques may be employed, the operator has deployed the network according to FIG. 5. In the illustrated system, several cells transmitting carrier type A are operating on frequency F1, while several cells transmitting carrier type B are simultaneously operated on frequency F2. According to the presently disclosed techniques, when UEs of type A (i.e., UEs that support operation on carrier type A but not carrier type B) are in IDLE mode, they will camp on F1. UEs of type B (i.e., UEs that support operation on both carrier type A and carrier type B) will, in IDLE mode, camp on either F1 or F2. Likewise, a type A UE will camp on F1 as its primary cell (PCell) when in CONNECTED mode. A type B UE will camp on either F1 or F2 as its PCell when in CONNECTED mode.

According to several embodiments of the presently disclosed techniques, a network node, such as a serving eNB is configured to temporarily move legacy UEs of type A from F1 towards F2, given certain criteria. Example procedures and examples of the associated criteria to move the UEs towards F2 are further defined below. At a high level, moving the UEs from F1 towards F2 involves changing the transmitted carrier type on F2 to a carrier type that a type A UE can receive, i.e., to carrier type A. As further described below, it is also possible to move the type A UEs at a later stage from F2 to F1, given certain criteria.

Note that a particular UE of type A or type B may utilize both frequencies at the same time, with features such as carrier aggregation or dual connectivity, assuming that it can support the carrier type that is transmitted on each of the frequencies.

Criteria to Change Carrier Type on F2 from Carrier Type B to Carrier Type A

The criteria for switching carrier type on F2 from carrier type B to carrier type A for one or more cells may include a determination of one or more of the following:

that Type A UEs will experience better performance, e.g., in terms of downlink and/or uplink throughput or delay;

that a load in a certain cell or group of cells on F1 is too high to achieve sufficient performance—this can be compared with the load at a certain cell or group of cells on F2, where the type A UEs will potentially be handed over;

that there are more transmit and/or receive antennas available on cells on F2, and the cells on F1 are serving many UEs that are capable of utilizing this affect, hence better performance would be achieved if these UEs are moved to F2;

that there are type A UE or UEs that are closer to the F2 cell than the F1 cell and hence they will see a smaller path loss from the F2 cell than the F1 cell, which would result in higher performance if handed over to F2;

that the bandwidth in the cells on F2 is larger compared to the bandwidth of the cells in F1 and a corresponding type A UE can utilize this additional bandwidth better;

that a load in cells in F1 creates interference in the network on F1 that limits the performance too much—handing over of some of the UEs from F1 to F2 would decrease this load and thus reduce the interference, and would increase the load on F2, but below an acceptable load threshold on F2;

that the energy consumption on F2 will not increase above a certain threshold given the potential future load on F2;

that the presence of certain high-priority users or services in F1 that can reach higher performance if they can instead operate on F2—in using this criterion one should also consider whether there are high-priority users or services on F2 that would see their performance degrades due to the change of carrier type on F2 in certain cells;

that given the presence of certain high-priority users or services in F1 that can reach higher performance if they can also aggregate F2 with carrier type A—when using this criterion one should also consider whether there are high-priority users or services on F2 that would see their performance degrade due to the change of carrier type on F2 in certain cells;

that type A UEs are configured to regularly switch between a state where they actively monitor the carrier and a sleep state (e.g., discontinuous reception, or DRX)—when type A UEs are in the active mode, there is a criteria to switch the carrier type.

It is further noted that the criteria to change the carrier type on F2 in a certain cell or group of cells and move UEs from F1 to F2 can be a single one of the above criteria, in some embodiments, or a combination of several of the criteria. The different triggering conditions given above may also consider that a particular trigger has been valid for a certain time. It is further given that the criteria above describe the situation between F1 and F2. The comparison of the different triggers can also be between cells only on F2 as well, given that different carrier types are operated on F2.

Criteria to Change Carrier Type on F2 from Carrier Type A to Carrier Type B

The criteria for switching carrier type on F2 from carrier type A to carrier type B for one or more cells may include a determination of one or more of the following:

that the type B UEs will experience better performance, e.g., in terms of downlink and/or uplink throughput or delay—this could refer to UEs in the cell that are switched and also in other cells in the networks, for example due to that less interference is created by the given cell or group of cells;

that the load created by UEs of type A in a certain cell or group of cells on F2 is low, such that handing these UEs over to F1 may not cause any large performance degradation for these UEs—consideration can also be made with respect to the load on the target cell of these UEs that they will be handed over to;

that there are type A UEs that are closer to the F1 cell than the F2 cell and that will thus see a smaller path loss from the F1 cell than the F2 cell, which would result in higher performance if they are handed over to F1;

that the bandwidth in the cells on F1 is larger compared to the bandwidth of the cells in F2 and a corresponding type A UE can utilize this additional bandwidth better;

that the load in cells in F2 creates interference in the network on F2, which limits the performance too much—handing over some of the UEs from F2 to F1 would decrease the interference, while increasing the load on F1 but below an acceptable load threshold on F2.

that the energy consumption on F2 is above a certain operating threshold and needs to be decreased.

the presence of certain high-priority users or services in F2 that can reach higher performance if they can also operate on F2 if it is operated as a carrier type B—in using this criterion, one should also consider whether there are high-priority users or services on F1 that would see their performance decrease due to the change of carrier type on F2 in certain cells, since type A UEs on F2 would need to be handed over to cells on F1.

the presence of certain high-priority users or services in F2 that can reach higher performance if they can also aggregate F1 with carrier type A—in using this criterion one should also consider whether there are high-priority users or services on F2 that would see their performance decrease due to the change of carrier type on F2 in certain cells, since type A UEs on F2 would need to be handed over to cells on F1.

that Type A UEs are configured to regularly switch between a state where they actively monitor the carrier and a sleep state (e.g., DRX)—during periods when type A UEs are in the sleep state, there is a criteria to switch the carrier type, as this would save energy for the network.

It should be noted that the criteria to change the carrier type on F2 in certain cells or groups of cells and move UEs from F2 to F1 can be one of the above criteria or a combination of several of the criteria's. The different triggering conditions given above may also consider that the trigger has been valid for a certain time. The comparison of the different triggers can also be between cells only on F2 as well, given that different carrier types are operated on F2.

Handling UEs when Changing Carrier Type on F2

If a carrier type is to be changed on F2, it can be changed either from carrier type A to carrier type B or from carrier type B to carrier type A. The procedure for these two different steps is to some extent similar, but also differs at some points. In the following two subsections, each of these steps are further described. The described procedures can be carried out for a group of cells at a given time, or for only an individual cell. In the following, the procedure is described for a single cell only, although it should be understood that the procedure can easily be extended to a group of cells.

Changing from Carrier Type B to Carrier Type A

According to a first approach, before performing the change of carrier type, the cell can inform those UEs of type B that it is currently serving that a change of carrier type will occur. The cell may inform the UEs of the time when this switch is to occur. Alternatively, the cell may not define the time when it will occur, although the UEs can assume that the change will happen reasonably close in time. Further, when the UEs are informed that the change will occur, they can also be informed what parameters the new cell of type A will be using, for example a cell identification, a part of or the whole content of system information for the carrier type, e.g., as reflected in a Master Information Block (MIB) and/or System Information Blocks (SIBs), and/or a CRS antenna configuration. After the UEs are informed that a change will occur, the network can then change the carrier type that is transmitted from the cell.

The triggering of the change of carrier type at the UE can, for example, be done by one of these examples:

a type B UE receives information of the carrier type in a MIB or SIB, and then assumes that the indicated carrier type will be used beginning from a pre-defined frame where changes could occur.

In one non-limiting example, the transmission of carrier type A starts at the beginning of the next radio frame (which has a duration of 10 milliseconds in LTE).

In a second non-limiting example, the transmission of carrier type A starts in a subframe with subframe number SFN satisfying the expression mod(SFN,X)=0, where X is a value pre-defined and known to both the eNB and the UEs. In one implementation of this approach, the value X is defined in the specification for the wireless communication system. In another implementation of this approach, the value is configured by the eNB via higher layer signaling (e.g., RRC signaling).

In yet another non-limiting example, transmission of carrier type A starts N subframes after such carrier type change notification, where N can defined in the specification for the wireless communication system.

A PDCCH or EPDCCH that is scrambled by a special carrier-type-change notification RNTI (CTC-RNTI) can be used to notify all UEs of the upcoming carrier type change at a time as determined in the above.

The reserved control format indicator (CFI) value is used to indicate that a change from A to B is imminent, i.e. CFI=0.

In transmission mode 10 (TM10), the 'reserved state' for indicating PDSCH/EPDCCH start symbol is used, i.e. start symbol 0, indicating a A→B change is upcoming.

The UE can also be paged using a specific flag in the paging message.

According to a second approach, procedures and designs are disclosed to utilize the close compatibility between an LTE LCT (type A carrier) and an LTE NCT (type B carrier) and the capability of type B UEs (i.e., those UEs that support both LTE LCT and LTE NCT).

According to this approach, the carrier types before and after switching can carry the same cell ID and preferably, but not necessarily, as many other common aspects of system information as possible. For example, the carrier bandwidth could be the same. Even configurations such as which EPDCCH sets are set up can be common to both carriers, except for variations of the start symbol. The start symbol on the NCT could change to 0 by default. Therefore when switching from A to B, the UEs of type B may be able to operate on the NCT with minimal extra information delivered.

Further, the UEs of type B that are currently served by the eNB that is about to change cell type may utilize a light-weight handover (HO) mechanism to handle the cell change. The characterizing factors of this light-weight HO procedure are further described here for both user plane and control plane. It is given that the characterizing factors described here may not all be performed in every embodiment—rather, one or several of them may be performed.

On the user plane, type B UEs do not reset the HARQ buffers, and current ongoing transmissions are kept in operation. The UEs may further operate UE-specific EPDCCH, DMRS scrambling, CSI-RS configuration, MBMS presence, quasi-collocation configuration, etc., as previously configured when the carrier was in type B.

The transmission modes of the type B UEs can be automatically changed to compatible transmission modes available in type A carrier. For instance, the non-codebook based precoding transmission mode (11) in type B carrier is automatically changed to transmission mode 10 in type A carrier. A transmit diversity transmission mode (12) in type B carrier is automatically changed to transmission mode 2.

On the control plane, the UE keeps its context with its RRC configurations and Cell Radio Network Temporary Identifier (C-RNTI), which is a mobile terminal identifier allocated by a controlling Radio Network Controller (RNC) and which is unique within (i.e., specific to) one cell controlled by the RNC. Further, the eNB performing the change of carrier type will not inform the core network that the UE is performing a light-weight HO to the changed cell type. This will save significant signaling to the core network if the cell that is changing cell type is serving many UEs that support the light-weight HO.

One advantage of staying connected during a carrier switch (e.g., compared to going idle) is maintained service quality. From a user perspective, the experience of changing carrier should be similar to the experience of a handover, i.e., not noticeable.

Still another approach to handling changes in carrier type is that the UEs that are currently served by a cell on F2 and that is about to change carrier type are handed over to other cells. These cells may be other cells on the same frequency or located on different frequencies, for example on F1. After all UEs are handed over to other cells, then the switch in carrier type will occur. The network can then, at a later stage, hand over UEs back to the cell on F2.

Another alternative is that the UEs that are currently served by the cell on F2 that is about to change carrier type are not informed that the switch will occur. The cell changes carrier type at a certain occasion in time. The UEs that were served by the cell will then declare radio link failure (RLF) and will try to initiate radio link recovery towards the network.

Still another alternative is that the UEs that are currently served by a cell on F2 and that is about to change carrier type are handed over to other radio access technologies (RATs). These RATs may consist of other cells on the same frequency or located on different frequencies, for example on F1. After all UEs are handed over to cells on other RATs the change will occur. The network can then at a later stage hand over UEs back to the cell of the original RAT on F2.

Yet one more alternative is that the UEs that are currently served by a cell on F2 and that is about to change carrier type are signaled with an RRCConnectionRelease, forcing the UE to go to RRC_IDLE. The cell F2 can then be configured such that the UE is barred from accessing it. After all UEs served by the cell on F2 that is about to change carrier type are released, the change of carrier type will occur. The network can then remove the configuration barring UEs from accessing it, thus allowing UEs to be served by the cell.

Changing from Carrier Type A to Carrier Type B

As a first step, the UEs of type A that the cell is serving are handed over to other cells that are operating carrier type A. These can be on either the same frequency or on a different frequency. A second alternative is that the UEs of type A are not informed that a switch will occur. This will require them to reconnect to another cell after this switch has occurred.

The procedure for type B UEs follows the same procedure as in the previous section with the difference that the carrier type is changed from A to B. This affects, for example, the signaling of information prior to switch as there are no CRS present on carrier type B. The UE is instead informed with applicable parameters that it needs to operate carrier type B, which can for example be cell ID and part or whole content of the MIB and SIBs for the carrier type.

Example Process Flows

Figure 6:
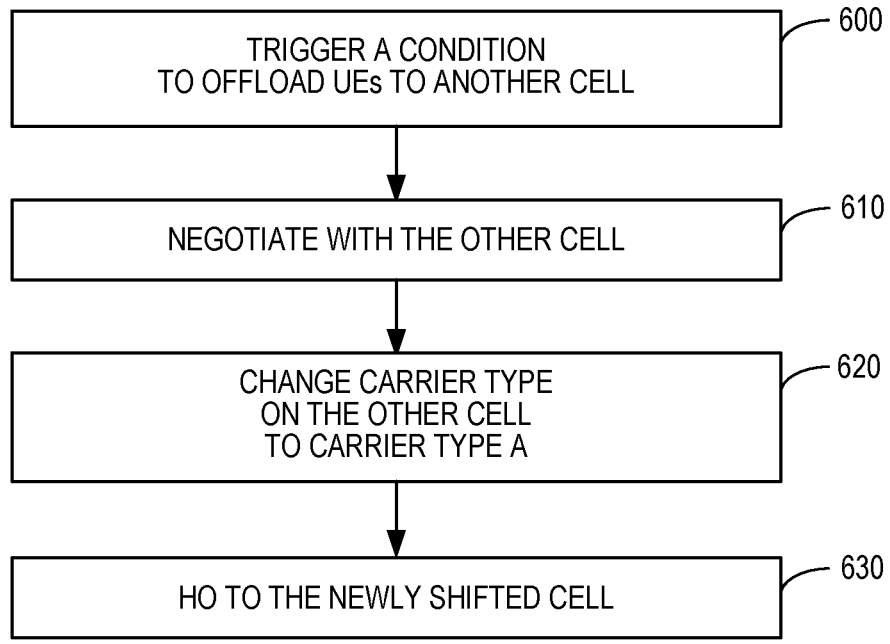
FIG. 6 is a process flow diagram illustrating an example process for offloading UEs to another cell.
Figure 7:
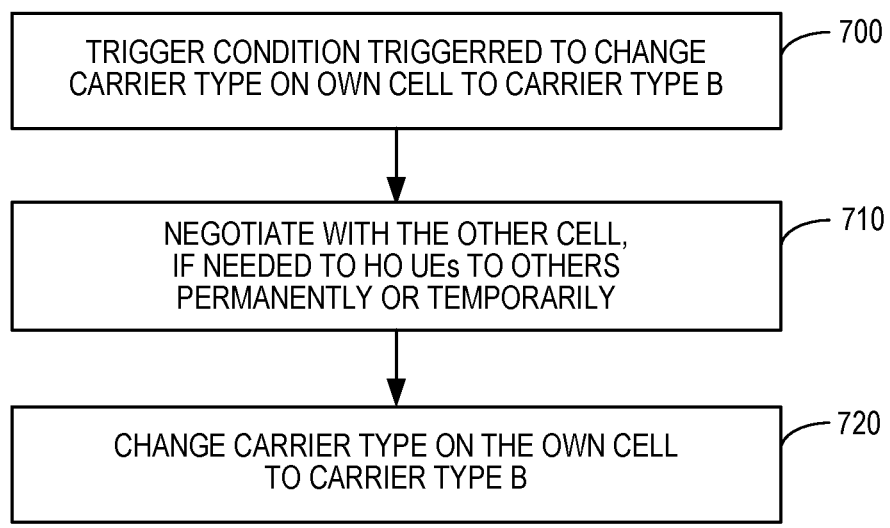
FIG. 7 is a process flow diagram showing an example process or changing from a new carrier type to a legacy carrier type.

Given the procedures and techniques described in detail above, it will be appreciated that FIG. 6 illustrates an example process flow for offloading UEs to another cell, where the process involves changing a target carrier from a legacy carrier type to a new carrier type. FIG. 7 illustrates an example process flow for changing from a new carrier type to a legacy carrier type. The process flow illustrated in FIG. 8 generalizes these procedures and thus illustrates a process for changing a carrier type on one or more cells from a first carrier type to a second carrier type.

The process flow shown in FIG. 6 begins, as shown at block 600, with the triggering of a condition to offload UEs to another cell. Several criteria to change a carrier type from carrier type A to carrier type B were described in detail above; any one or more of these criteria, alone or in combination with one or more other criteria, may be used to trigger this condition.

As shown at block 610, the offloading procedure may require negotiation with the other cell, i.e., the cell to which the UEs are to be offloaded. This negotiation may comprise, for example, notifying the other cell that type A UEs are about to be offloaded and that the other cell must therefore change its carrier type from carrier type B to carrier type A, so that the type A UEs can operate on the new cell. As shown at block 620, the carrier type on the other cell is changed to carrier type A, after which a handover (HO) to the other cell is performed for at least type A UEs, as shown at block 630. Note that any of the several methods described above for triggering handovers may be used.

As noted above, FIG. 7 illustrates an example process flow for changing from a new carrier type to a legacy carrier type. As shown at block 700, the process begins with the triggering of a condition for changing carrier type on own cell to carrier type B. Again, several criteria to change a carrier type from carrier type B to carrier type A were described in detail above; any one or more of these criteria, alone or in combination with one or more other criteria, may be used to trigger this condition.

Because the cell is about to be changed to a new carrier type, it may be necessary to handover at least type A UEs to a cell that is supporting a legacy carrier type. Thus, as shown at block 710, the illustrated process further includes negotiating with the other cell, if needed, to facilitate handover of at least the type A UEs to the other cell. The handover may be temporary for all or some of the UEs, such as for type B UEs that are to be accepted back in the own cell after the carrier type change. It may be "permanent," i.e., for an indefinite length of time, for other UEs.

As shown at block 720, the carrier type on the own cell is changed to carrier type B, i.e., to a new carrier type. This may be performed after handover of at least type A UEs, in some instances or in some embodiments. In other embodiments, the changing of the carrier type itself may force some or all of the UEs camped on the own cell to relocate to one or more other cells, as described in the various detailed examples provided above.

As noted above, the process flow diagram of FIG. 8 illustrates more generally an example process flow for changing a carrier type from a first carrier type to a second carrier type. The illustrated method may be implemented in one or more nodes of a cellular system that includes a plurality of cells that can each be selectively operated with either a first carrier type or a second carrier type, one of the first and second carrier types either having substantially fewer reference symbols than the other or lacking a control structure supported by the other, or both.

As shown at block 800, the illustrated method begins with determining that a cell or cells should be switched from the first carrier type to a second carrier type. This may be done based on, for example an evaluation of UE performance criteria, e.g., whether one or more UEs are capable of operating on the second carrier type and/or whether one or more UEs may receive a higher quality of service from the second carrier type. As shown at block 810, the illustrated method continues with changing the carrier type on the cell or cells from the first carrier type to the second carrier type.

In some embodiments, as discussed in detail above, the first carrier type is an LTE legacy carrier type and the second carrier type is a carrier type having substantially fewer reference symbols than the LTE legacy carrier type. In some of these embodiments, the second carrier type comprises a discovery signal, such as a discovery signal that includes a first synchronization signal having a signal structure common to a second synchronization signal carried by the first carrier type, but where the first synchronization signal appears in the second carrier type less frequently than the second synchronization signal appears in the first carrier type.

In some embodiments, the method further includes triggering a relocation of all mobile terminals served by the cell or cells to one or more additional cells, prior to changing the carrier type. In other embodiments, the method includes triggering a relocation of mobile terminals that are served by the cell or cells and that do not support the second carrier type to one or more additional cells, prior to changing the carrier type. In any of these embodiments, triggering the relocation of mobile terminals served by the cell or cells may comprise triggering a relocation of one or more of the mobile terminals to a different carrier frequency. Alternatively, triggering the relocation of mobile terminals served by the cell or cells may comprise informing the mobile terminals of a change in carrier type, or may comprise handing over all or some of the mobile terminals to a new cell and/or to a new frequency. Triggering the relocation of mobile terminals served by the cell or cells may alternatively comprise initiating a Radio Resource Control connection release for the mobile terminals.

In some embodiments, the method further comprises informing at least those mobile terminals that are served by the cell or cells and that support the second carrier type of an upcoming change in carrier type, prior to changing the carrier type on the cell or cells from the first carrier type to the second carrier type. This informing may include, for example, sending one or more parameters for the second carrier type. These parameters may include, in some embodiments, one or more of a time, frame, or subframe, for the change in carrier type, a cell identifier for the second carrier type, and reference signal configuration information for the second carrier type. This informing may comprise, in some embodiments, the use of one or more of the following to inform those mobile terminals that are served by the cell or cells and that support the second carrier type of an upcoming change in carrier type: a broadcasted master information block (MIB) or system information block (SIB); a physical downlink control channel message or enhanced physical downlink control channel message that is scrambled using an identifier that indicates an upcoming change in carrier type; a transmitted control format indicator having a value that indicates an upcoming change in carrier type; a transmitted flag, normally used for indicating a start symbol for a downlink channel, having a value that indicates an upcoming change in carrier type; and a flag in a paging message addressed to one or more mobile terminals.

Figure 9:
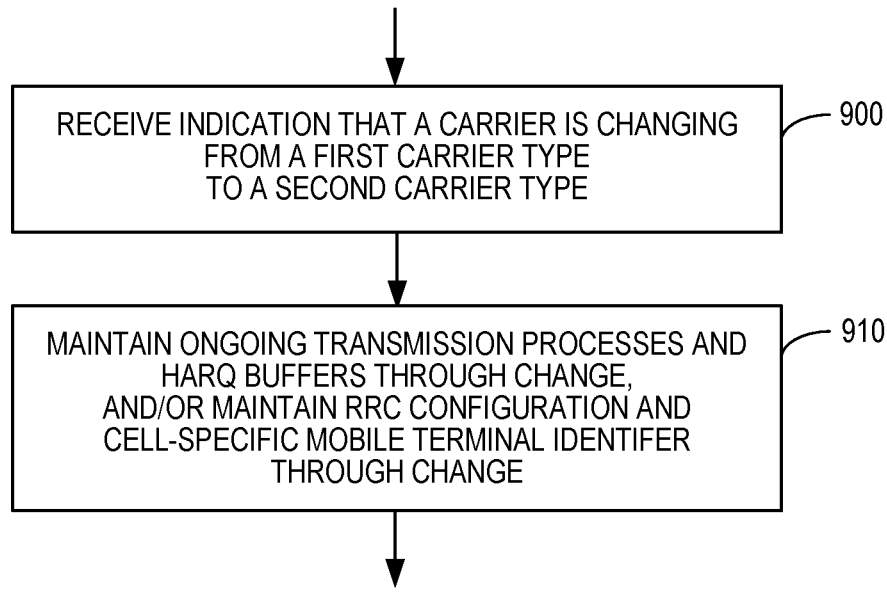
FIG. 9 illustrates an example method for managing a transition in a mobile terminal from one carrier type to another.

FIG. 9 illustrates a corresponding method, suitable for implementation in a mobile terminal, for managing a transition from one carrier type to another, one of the carrier types either having substantially fewer reference symbols than the other or lacking a control structure supported by the other. As shown at block 900, the illustrated method begins with receiving an indication that a currently received carrier is changing from one carrier type to another carrier type. As shown at block 910, the method further includes maintaining ongoing transmission processes and hybrid-ARQ buffers through the change in carrier types, or maintaining Radio Resource Control (RRC) Configuration and a cell-specific mobile terminal identifier, e.g., a C-RNTI, through the change in carrier types, or both.

In some embodiments, the method further comprises automatically changing from a first transmission mode to a second transmission mode upon the change from the first carrier type to the second carrier type. In others, the method further comprises automatically beginning to monitor a control channel structure that was not available on the first carrier type upon the change from the first carrier type to the second carrier type.

In some embodiments, receiving the indication comprises receiving one or more parameters for the second carrier type. These one or more parameters may include, for example, one or more of: a time, frame, or subframe, for the change in carrier type; a cell identifier for the second carrier type; and reference signal configuration information for the second carrier type. In various embodiments, the indication may be received via one or more of: a broadcasted master information block or system information block; a physical downlink control channel message or enhanced physical downlink control channel message that is scrambled using an identifier that indicates an upcoming change in carrier type; a transmitted control format indicator having a value that indicates an upcoming change in carrier type; a transmitted flag, normally used for indicating a start symbol for a downlink channel, having a value that indicates an upcoming change in carrier type; and a flag in a paging message addressed to one or more mobile terminals.

Figure 8:
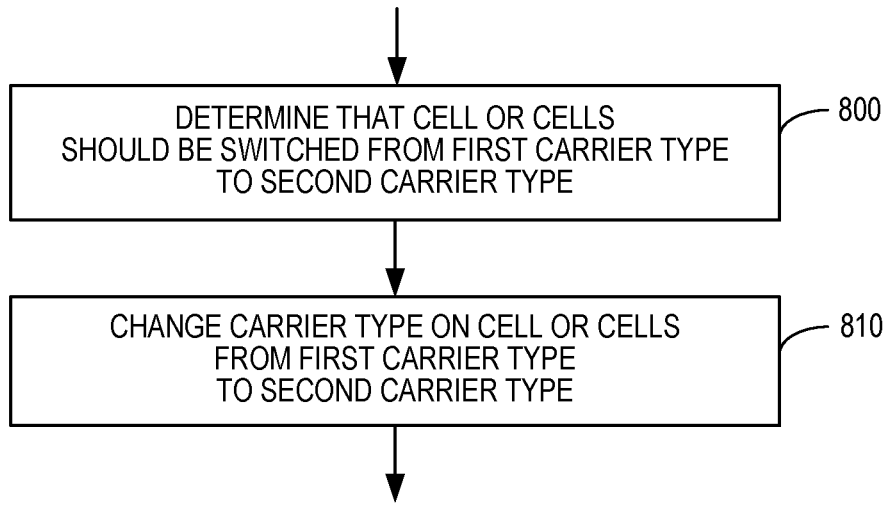
FIG. 8 is another process flow diagram showing a process for changing a carrier type from a first carrier type to a second carrier type.

Other variations of the methods illustrated in FIGS. 8 and 9 will be apparent, in view of the example embodiments described earlier in the present disclosure.

Example of a Flow in the Network

Following are details of an example, non-limiting sequence of operation in which one or more cells are switched from one carrier type to another, and back again. The operations detailed below are illustrated generally in FIGS. 6, 7, and 8, and are representative of an example embodiment of a method of processing in one or more network nodes, according to the network-side teachings herein. It will be appreciated that the processing indicated in FIGS. 6, 7, and 8 and discussed in the sequence below may be implemented at least in part via programmatic configuration of the one or more network nodes, based on the execution of stored computer program instructions, e.g., by the execution of a stored computer program by the processing circuit(s) and/or control circuits in an apparatus as detailed further below. It will also be appreciated that no particular processing order is necessarily implied by the figures above and that one or more of the illustrated method steps may be performed in an order different from the illustration, where the context permits. Further, one or more of the steps may be performed in parallel, and may be performed with respect to multiple wireless devices, and/or may be performed in an ongoing sense, e.g., as part of ongoing or background processing.

An example sequence of operations is as follows:
1. Identify that it is beneficial to move a UE or groups of UEs of type A to F2.

Figure 10:
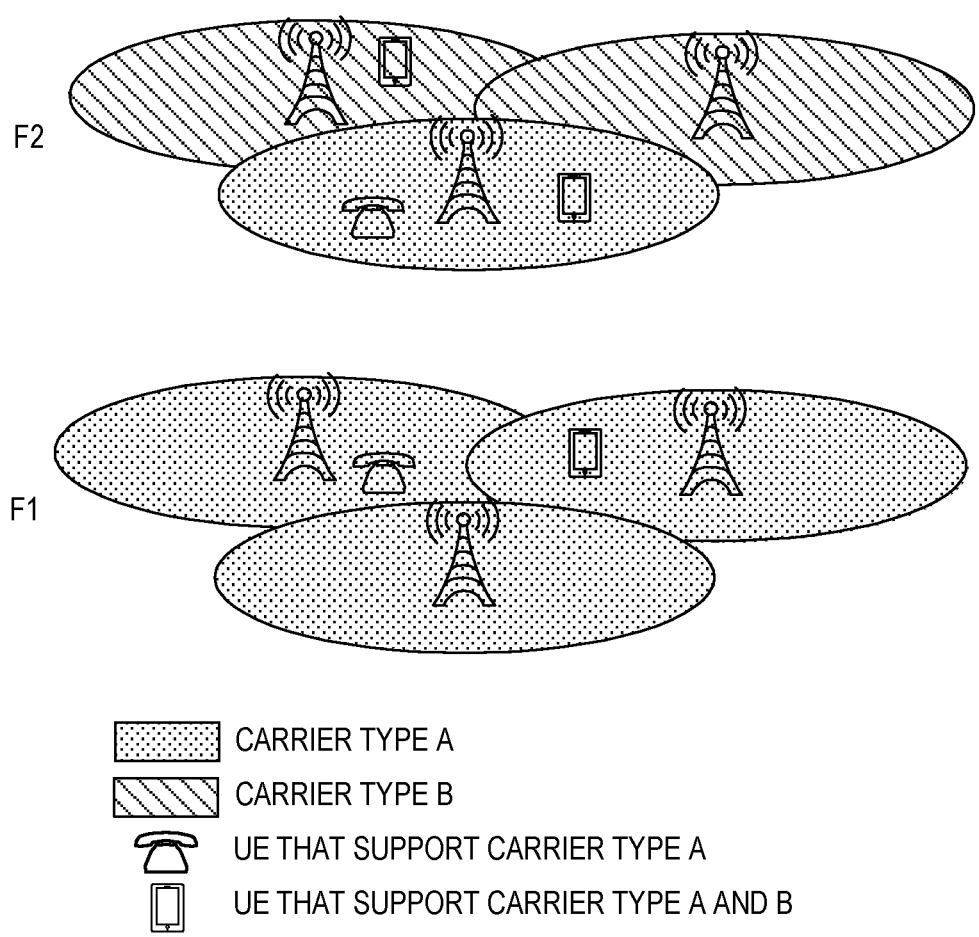
FIG. 10 illustrates a mixed deployment of carrier types.
Figure 11:
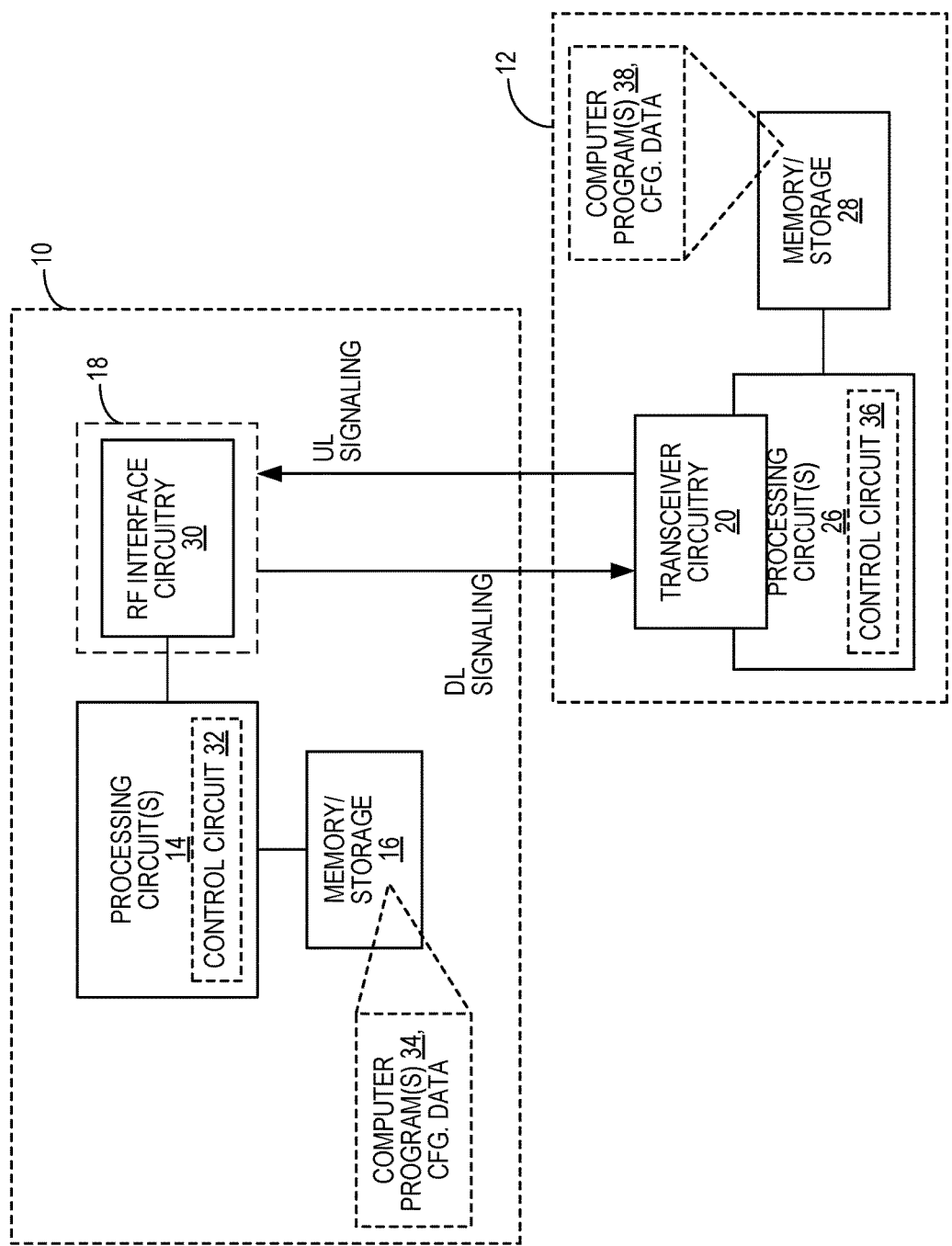
FIG. 11 is a block diagram illustrating details of a network node 10 and a wireless device.

2. Negotiate between eNB, on F1, and eNB, on F2, whether the UEs should be moved over.
   a. In such a negotiation the network needs to identify whether it is beneficial for both UEs B and UEs A, together with what the additional operating cost of the associated move would be, for example, in additional energy consumption.
3. If a switch of carrier type is triggered on the eNB on F2, then the eNB on F2 performs the following task:
   a. This task relates to how the eNB on F2 should handle the UEs it is currently serving. The list gives different exemplary procedures that can either be performed on their own or be combined.
      i. Inform currently served UEs that there will be a switch of carrier type at a specific time occasion or close in time from now.
      ii. Hand over the currently served UEs to the eNB on F1 or/and neighboring cells on either F1 or F2.
      iii. The eNB on F2 switches to carrier type B without informing the UEs. The previously served UEs would then declare RLF and try to perform Radio Link recovery towards the previously attached eNB or another eNB.
   b. Once the eNB on F2 has started to transmit carrier type A:
      i. Handover (HO) from the eNB on F1 to F2 is triggered for the UEs that should be offloaded on to the eNB on F2.
      ii. The network operation is now as illustrated in FIG. 10. The configuration illustrated in FIG. 10 can be compared with the starting configuration shown in FIG. 5.
   c. New terminals that enter the network on F1 continue to be offloaded towards F2 if the eNB is operating carrier type A there.
4. Over time, the UEs of type A that are operating on F2 will go into IDLE mode or move to other cells. When there are no remaining UEs of type A operating on F2, the eNB on F2 will initiate a switch back to carrier type B.
   a. The condition to switch back can also be associated with a triggering condition, such as the load in neighboring cells associated to UE type A traffic or the load in the own cell associated with UE type A traffic or a given time since the last UE of type A was served in the network.
   b. If a switch to carrier type B is triggered by the eNB on F2:
      i. The served UEs of type A if any are handed over to other cells
      ii. The served UEs of type B are
         1. handed over to neighboring cells
         2. informed that a switch of carrier type will occur in the future
5. Switch carrier type on F2 to carrier type B Network Components and Apparatus Embodiments FIG. 11 provides fuller example details for the network node 10 and the wireless device 12 that were illustrated in FIG. 2, in an embodiment where the network node 10 is an eNodeB or other type of base station or radio node. Consequently, the network node 10 in such embodiments includes radio frequency (RF) interface circuitry 30, which represents or is included in the communication interface(s) 18. Further, the processing circuits 14, which may comprise one or more microprocessors, DSPs, or other digital processing circuitry, include one or more control circuits 32 which are configured according to the teachings herein, and which also may be referred to as control units, processing circuits, and/or processing units. While not necessarily germane to understanding the functionality disclosed herein for the network node 10, it will be appreciated that the network node 10 may comprise a rack or cabinet of processing circuits using a card/backplane arrangement and may include a host of additional processing circuits/functions not shown in the simplified diagram.

Thus, the processing circuit(s) 14 may comprise any one or more computer-based circuits that control at least communication-related processing—e.g., transmit and receive operations through the RF interface circuitry 30. Such circuit(s) 14 may further include a number of other functional circuits not shown, such as user-scheduling circuits to control uplink and/or downlink transmissions among a plurality of wireless devices 12 being supported by the network node 10, and may further include one or more conditions-determination circuits, such as for determining network loading, e.g., for one or more served cells and/or one or more neighboring cells.

In an example configuration, the processing circuit(s) 14 include a control circuit 32 that is configured to perform at least some of the network-side processing taught herein for managing carrier type changes in a cellular network.

The RF interface circuitry 30 may be, for example, a cellular radio interface for communicating with pluralities of wireless devices 12 over a defined air interface according to defined communication protocols, e.g., according to the LTE standard.

In a similar fashion, the wireless device 12 may be configured to operate according to any one or more wireless communication standards, such as the WCDMA and/or LTE or LTE-A standards. Broadly, the wireless device 12 may support more than one Radio Access Technology (RAT), such as may be used in heterogeneous network deployments involving macro cells and base stations and micro cells and base stations, where macro and micro base stations may or may not use the same RAT(s).

The transceiver circuitry 20 therefore may comprise one or more cellular radios, and is shown overlapping the processing circuit(s) 26 to indicate that the receiver 22 and/or transmitter 24 may be implemented in a mix of analog and digital circuits, including baseband processing circuits comprising or otherwise included in the processing circuit(s) 26. In one such example, the processing circuit(s) 26 implement one or more received signal processing chains, which provide, for example, received signal linearization and/or interference compensation, symbol detection and corresponding decoding (Viterbi, joint detection, etc.), for the recovery of transmitted information.

In one or more embodiments, the processing circuit(s) 26 include a control circuit 36 that is configured to carry out at least some of the device-side processing taught herein, for managing a transition from one carrier type to another.

Figure 12:
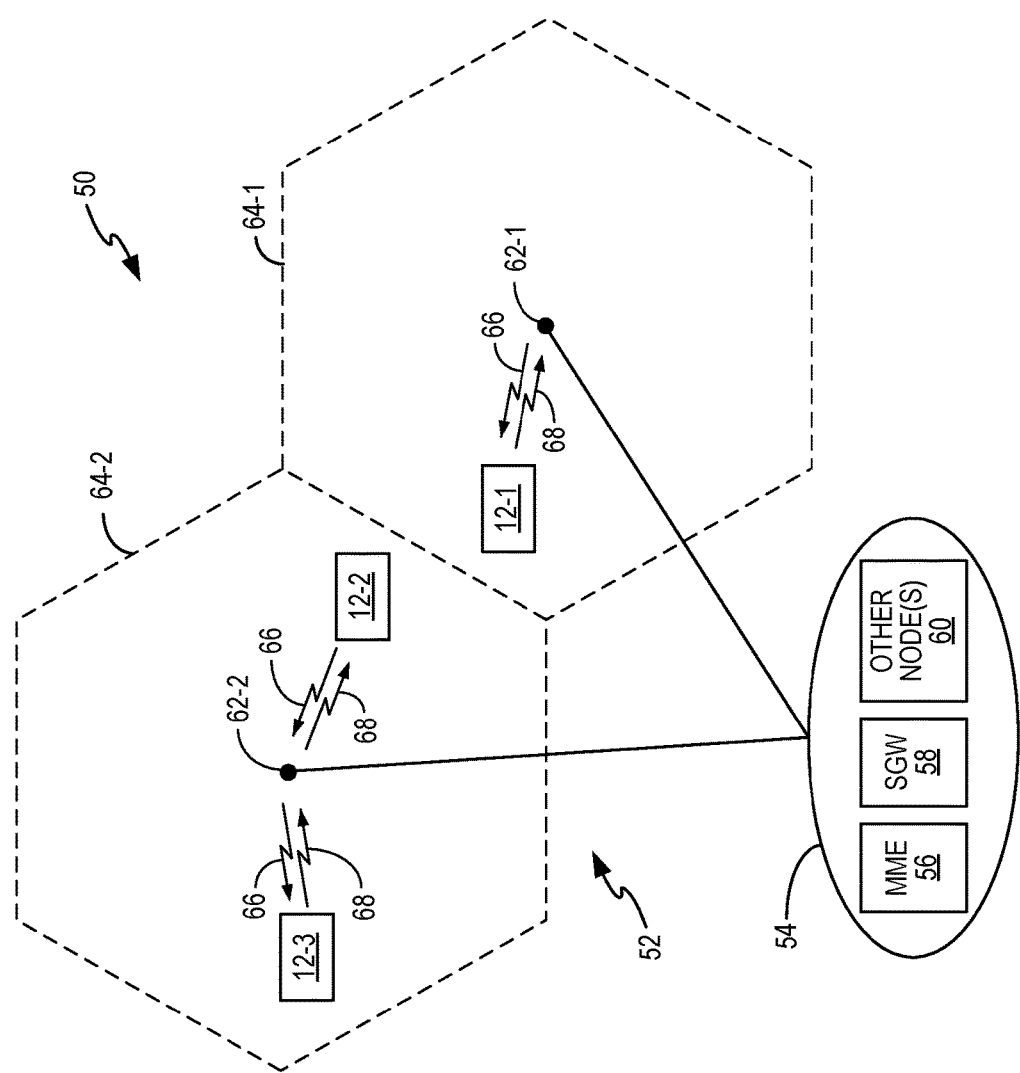
FIG. 12 illustrates an example of a homogenous network in which the inventive techniques disclosed herein may be applied.

Additional context for the techniques described herein is given by FIG. 12, which illustrates a homogenous network example wherein a wireless communication network 50 includes a radio access network (RAN) 52 and a core network (CN) 54. The CN 54 includes a Mobility Management Entity or MME 56, a Serving Gateway or SGW 58, and one or more other nodes 60, such as positioning nodes, O&M nodes, OSS nodes, SON nodes, etc. In the example shown in FIG. 12, one or more of the base stations 62 (e.g., eNodeBs) are configured to operate as the network node 10 described above.

Figure 13:
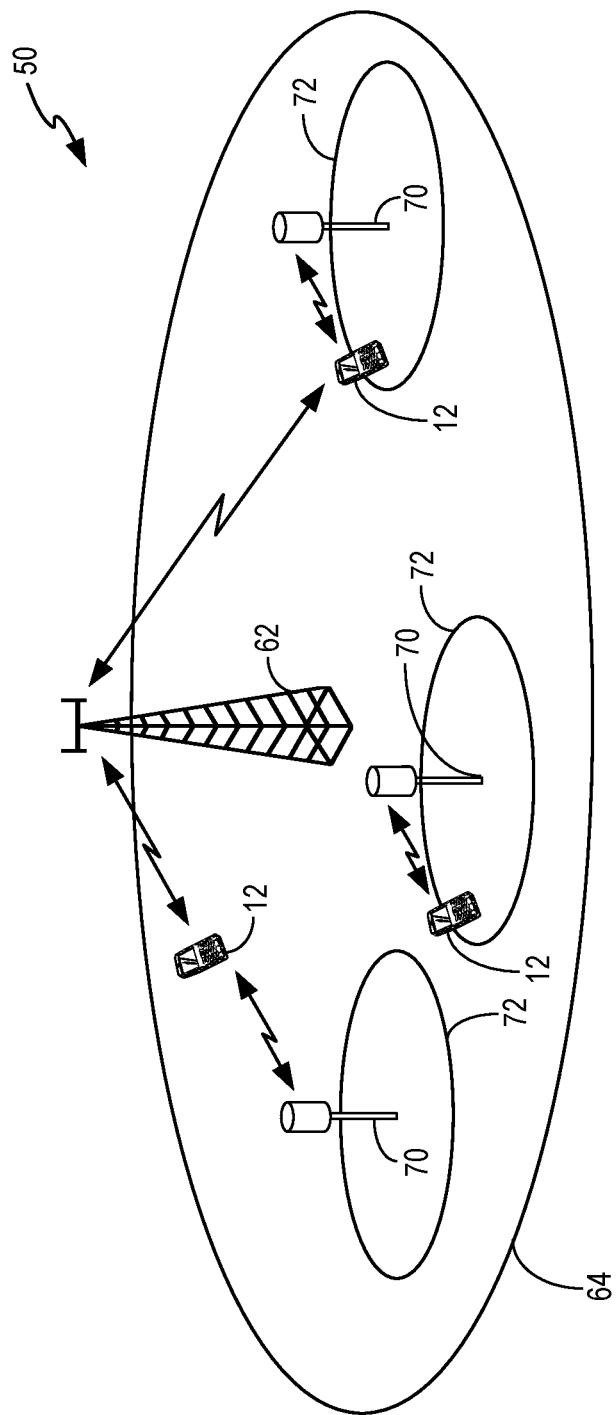
FIG. 13 illustrates an example of a heterogeneous network in which the inventive techniques disclosed herein may be applied.

In another example, such as shown in FIG. 13, the wireless communication network 50 is a heterogeneous network that includes a mix of "macro" cells 64 and "micro" cells 72. While the particular respective sizes of these cells 64, 72 are not fixed per se, macro cells 64 are characterized by their typically large sizes as compared to micro cells 72 (also referred to as hotspots, pico cells, femto cells, etc.).

Further distinguishing macro and micro cells 64, 72, macro cells 64 typically are served by base stations 62 that operate at high transmission powers as compared to the low-power base stations 70 which serve the micro cells 72, which base stations are often referred to as low-power nodes (LPNs), or access points, etc. The macro and micro cells 64 and 72 may be based on the same or on different Radio Access Technologies (RATs).

In any case, in FIG. 13, one sees that the wireless communication network 50 includes at least one macro base station 62 providing service in a corresponding macro cell 64. In turn, any one or more micro base stations 70 provide service in corresponding micro cells 72. In this example, the micro cells 72 overlay the macro cell 64 and thus may be regarded as hotspots which provide, e.g., enhanced data rate service and/or supplement the macro cell 64 with respect to coverage gaps within the geographic area corresponding to the macro cell 64. The network node 10 described above may be realized in the macro base station 62 and/or in the micro base stations 70.

The presently disclosed techniques allow a way to operate the NCT in mixed deployment with a legacy carrier type. In the present disclosure, these are referred to as carrier type B and A. This allows a gradual introduction of the NCT in networks, rather than having to operate a nationwide network with NCT directly from the start. It further allows ways to handle UEs not supporting the NCT operating on the same frequency as the NCT is deployed.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to similar networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, in one or more nodes of a cellular system that includes a plurality of cells that can each be selectively operated with either a first carrier type or a second carrier type, one of the first and second carrier types either having substantially fewer reference symbols than the other or lacking a control structure supported by the other, or both, the method comprising:
   determining that a cell or cells should be switched from the first carrier type to a second carrier type, based on an evaluation of User Equipment (UE) performance criteria, and
   changing the carrier type on the cell or cells from the first carrier type to the second carrier type.

2. The method of claim 1, wherein the first carrier type is a Long Term Evolution (LTE) legacy carrier type and the second carrier type is a carrier type having substantially fewer reference symbols than the LTE legacy carrier type.

3. The method of claim 2, wherein the second carrier type comprises a discovery signal.

4. The method of claim 3, wherein the discovery signal comprises a first synchronization signal having a signal structure common to a second synchronization signal carried by the first carrier type, but where the first synchronization signal appears in the second carrier type less frequently than the second synchronization signal appears in the first carrier type.

5. The method of claim 1, wherein the first carrier type is a Long Term Evolution (LTE) new carrier type and the second carrier type is an LTE legacy carrier type.

6. The method of claim 1, wherein the first carrier type is a Long Term Evolution (LTE) legacy carrier type and the second carrier type is an LTE new carrier type.

7. The method of claim 1, further comprising triggering a relocation of mobile terminals that are served by the cell or cells and that do not support the second carrier type to one or more additional cells, prior to changing the carrier type.

8. The method of claim 1, further comprising triggering a relocation of all mobile terminals served by the cell or cells to one or more additional cells, prior to changing the carrier type.

9. The method of claim 8, wherein triggering the relocation of mobile terminals served by the cell or cells comprises triggering a relocation of one or more of the mobile terminals to a different carrier frequency.

10. The method of claim 8, wherein triggering the relocation of mobile terminals served by the cell or cells comprises informing the mobile terminals of a change in carrier type.

11. The method of claim 8, wherein triggering the relocation of mobile terminals served by the cell or cells comprises handing over the mobile terminals to a new cell or to a new frequency, or both.

12. The method of claim 8, wherein triggering the relocation of mobile terminals served by the cell or cells comprises initiating a Radio Resource Control connection release for the mobile terminals.

13. The method of claim 1, the method further comprising informing at least those mobile terminals that are served by the cell or cells and that support the second carrier type of an upcoming change in carrier type, prior to changing the carrier type on the cell or cells from the first carrier type to the second carrier type.

14. The method of claim 13, wherein said informing comprises sending one or more parameters for the second carrier type.

15. The method of claim 14, wherein the one or more parameters include one or more of:
   a time, frame, or subframe at which the change in carrier type is to take place;
   a cell identifier for the second carrier type; and
   reference signal configuration information for the second carrier type.

16. The method of claim 13, wherein said informing comprises using one or more of the following to inform those mobile terminals that are served by the cell or cells and that support the second carrier type of an upcoming change in carrier type:

a broadcasted master information block or system information block;

a physical downlink control channel message or enhanced physical downlink control channel message that is scrambled using an identifier that indicates an upcoming change in carrier type;

a transmitted control format indicator having a value that indicates an upcoming change in carrier type;

a transmitted flag, normally used for indicating a start symbol for a downlink channel, having a value that indicates an upcoming change in carrier type; and a flag in a paging message addressed to one or more mobile terminals.

17. A network node for use in a cellular system that includes a plurality of cells that can each be selectively operated with either a first carrier type or a second carrier type, one of the first and second carrier types either having substantially fewer reference symbols than the other or lacking a control structure supported by the other, or both, the network node comprising a processing circuit adapted to:

determine that a cell or cells should be switched from the first carrier type to a second carrier type, based on an evaluation of User Equipment (UE) performance criteria, and change the carrier type on the cell or cells from the first carrier type to the second carrier type.

18. The network node of claim 17, wherein the first carrier type is a Long Term Evolution (LTE) legacy carrier type and the second carrier type is a carrier type having substantially fewer reference symbols than the LTE legacy carrier type.

19. The network node of claim 18, wherein the second carrier type comprises a discovery signal.

20. The network node of claim 19, wherein the discovery signal comprises a first synchronization signal having a signal structure common to a second synchronization signal carried by the first carrier type, but where the first synchronization signal appears in the second carrier type less frequently than the second synchronization signal appears in the first carrier type.

21. The network node of claim 17, wherein the first carrier type is a Long Term Evolution (LTE) new carrier type and the second carrier type is an LTE legacy carrier type.

22. The network node of claim 17, wherein the first carrier type is a Long Term Evolution (LTE) legacy carrier type and the second carrier type is an LTE new carrier type.

23. The network node of claim 17, wherein the processing circuit is further adapted to trigger a relocation of mobile terminals that are served by the cell or cells and that do not support the second carrier type to one or more additional cells, prior to changing the carrier type.

24. The network node of claim 17, wherein the processing circuit is further adapted to trigger a relocation of all mobile terminals served by the cell or cells to one or more additional cells, prior to changing the carrier type.

25. The network node of claim 24, wherein the processing circuit is adapted to trigger the relocation of mobile terminals served by the cell or cells by triggering a relocation of one or more of the mobile terminals to a different carrier frequency.

26. The network node of claim 24, wherein the processing circuit is adapted to inform the mobile terminals of a change in carrier type.

27. The network node of claim 24, wherein the processing circuit is adapted to trigger a hand over the mobile terminals to a new cell or to a new frequency, or both.

28. The network node of claim 24, wherein the processing circuit is adapted to trigger the relocation of mobile terminals served by the cell or cells by initiating a Radio Resource Control connection release for the mobile terminals.

29. The network node of claim 17, wherein the processing circuit is adapted to inform at least those mobile terminals that are served by the cell or cells and that support the second carrier type of an upcoming change in carrier type, prior to changing the carrier type on the cell or cells from the first carrier type to the second carrier type.

30. The network node of claim 29, wherein the processing circuit is adapted to perform said informing by sending one or more parameters for the second carrier type.

31. The network node of claim 30, wherein the one or more parameters include one or more of:

a time, frame, or subframe at which the change in carrier type is to take place;

a cell identifier for the second carrier type; and reference signal configuration information for the second carrier type.

32. The network node of claim 29, wherein the processing circuit is adapted to use one or more of the following to inform those mobile terminals that are served by the cell or cells and that support the second carrier type of an upcoming change in carrier type:

a broadcasted master information block or system information block;

a physical downlink control channel message or enhanced physical downlink control channel message that is scrambled using an identifier that indicates an upcoming change in carrier type;

a transmitted control format indicator having a value that indicates an upcoming change in carrier type;

a transmitted flag, normally used for indicating a start symbol for a downlink channel, having a value that indicates an upcoming change in carrier type; and a flag in a paging message addressed to one or more mobile terminals.

33. A method, in a mobile terminal, for managing a transition from one carrier type to another, one of the carrier types either having substantially fewer reference symbols than the other or lacking a control structure supported by the other, or both the method comprising:

receiving an indication that a currently received carrier is changing from a first carrier type to a second carrier type; and maintaining ongoing transmission processes and Hybrid Automatic Repeat reQuest (HARQ) buffers through the change in carrier types, or maintaining Radio Resource Control configuration and cell-specific mobile terminal identifier through the change in carrier types, or both.

34. The method of claim 33, further comprising automatically changing from a first transmission mode to a second transmission mode upon the change from the first carrier type to the second carrier type.

35. The method of claim 33, further comprising automatically beginning to monitor a control channel structure that was not available on the first carrier type upon the change from the first carrier type to the second carrier type.

36. The method of claim 33, wherein receiving said indication comprises receiving one or more parameters for the second carrier type.

37. The method of claim 36, wherein the one or more parameters include one or more of:

a time, frame, or subframe at which the change in carrier type is to take place;

a cell identifier for the second carrier type; and reference signal configuration information for the second carrier type.

38. The method of claim 33, wherein receiving said indication comprises receiving the indication via one or more of:
- a broadcasted master information block or system information block;
- a physical downlink control channel message or enhanced physical downlink control channel message that is scrambled using an identifier that indicates an upcoming change in carrier type;
- a transmitted control format indicator having a value that indicates an upcoming change in carrier type;
- a transmitted flag, normally used for indicating a start symbol for a downlink channel, having a value that indicates an upcoming change in carrier type; and
- a flag in a paging message addressed to one or more mobile terminals.

39. A mobile terminal for use in a cellular system that includes a plurality of cells that can be selectively operated with either a first carrier type or a second carrier type, one of the first and second carrier types either having substantially fewer reference symbols than the other or lacking a control structure supported by the other, or both, the mobile terminal comprising a radio transceiver and a processing circuit adapted to:
- receive an indication that a currently received carrier is changing from a first carrier type to a second carrier type; and
- maintain ongoing transmission processes and Hybrid Automatic Repeat reQuest (HARQ) buffers through the change in carrier types, or maintaining Radio Resource Control configuration and cell-specific mobile terminal identifier through the change in carrier types, or both.

40. The mobile terminal of claim 39, wherein the processing circuit is further adapted to automatically change from a first transmission mode to a second transmission mode upon the change from the first carrier type to the second carrier type.

41. The mobile terminal of claim 39, wherein the processing circuit is further adapted to automatically begin to monitor a control channel structure that was not available on the first carrier type upon the change from the first carrier type to the second carrier type.

42. The mobile terminal of claim 39, wherein the processing circuit is adapted to receive said indication by receiving one or more parameters for the second carrier type.

43. The mobile terminal of claim 42, wherein the one or more parameters include one or more of:
- a time, frame, or subframe at which the change in carrier type is to take place;
- a cell identifier for the second carrier type; and
- reference signal configuration information for the second carrier type.

44. The mobile terminal of claim 39, wherein the processing circuit is adapted to receive said indication via one or more of:
- a broadcasted master information block or system information block;
- a physical downlink control channel message or enhanced physical downlink control channel message that is scrambled using an identifier that indicates an upcoming change in carrier type;
- a transmitted control format indicator having a value that indicates an upcoming change in carrier type;
- a transmitted flag, normally used for indicating a start symbol for a downlink channel, having a value that indicates an upcoming change in carrier type; and
- a flag in a paging message addressed to one or more mobile terminals.

* * * * *